United States Patent
De Wolf et al.

(10) Patent No.: US 9,803,134 B2
(45) Date of Patent: Oct. 31, 2017

(54) ACIDIC AQUEOUS SOLUTION CONTAINING A CHELATING AGENT AND THE USE THEREOF

(75) Inventors: Cornelia Adriana De Wolf, Eerbeek (NL); James N. Lepage, Chicago, IL (US); Johanna Hendrika Bemelaar, Arnhem (NL)

(73) Assignee: AKZO NOBEL CHEMICALS INTERNATIONAL B.V., Arnhem (NL)

( * ) Notice: Subject to any disclaimer, the term of this patent is extended or adjusted under 35 U.S.C. 154(b) by 769 days.

(21) Appl. No.: 12/812,358

(22) PCT Filed: Oct. 10, 2008

(86) PCT No.: PCT/EP2008/063618
§ 371 (c)(1),
(2), (4) Date: Jul. 9, 2010

(87) PCT Pub. No.: WO2009/086954
PCT Pub. Date: Jul. 16, 2009

(65) Prior Publication Data
US 2010/0276152 A1    Nov. 4, 2010

Related U.S. Application Data

(60) Provisional application No. 61/019,913, filed on Jan. 9, 2008.

(30) Foreign Application Priority Data

Feb. 7, 2008   (EP) ...................................... 08151179

(51) Int. Cl.
C09K 8/74        (2006.01)
C11D 3/04        (2006.01)
(Continued)

(52) U.S. Cl.
CPC ................ C09K 8/74 (2013.01); C09K 8/528 (2013.01); C11D 3/042 (2013.01); C11D 3/2075 (2013.01);
(Continued)

(58) Field of Classification Search
None
See application file for complete search history.

(56) References Cited

U.S. PATENT DOCUMENTS 7,204,936 B2    4/2007   Kitayama et al.
7,316,275 B2    1/2008   Wang et al.
(Continued)

FOREIGN PATENT DOCUMENTS

EP    1 004 571         5/2000
EP    1 434 927 B1      7/2004
(Continued)

OTHER PUBLICATIONS

"Acidic," retrieved from Merriam-Webster dictionary at http://www.merriam-webster.com/dictionary/acidic, Jul. 7, 2014.*
(Continued)

*Primary Examiner* — Angela M Ditrani
(74) *Attorney, Agent, or Firm* — Sandra B. Weiss

(57) ABSTRACT

An acidic aqueous solution containing a chelating agent and an acid, wherein the chelating agent is glutamic acid N,N-diacetic acid (GLDA) or a salt thereof, and wherein the amount of GLDA or the salt thereof is at least 10 wt %, based on the weight of the aqueous solution, and to the use thereof as an oilfield chemical, in descaling processes, or in processes in which highly concentrated aqueous acids are used, such as cleaning processes or plating processes.

26 Claims, 2 Drawing Sheets

(51) Int. Cl.
*C11D 3/20* (2006.01)
*C11D 3/30* (2006.01)
*C11D 7/08* (2006.01)
*C11D 7/26* (2006.01)
*C11D 7/32* (2006.01)
*C25D 3/02* (2006.01)
*C09K 8/528* (2006.01)

(52) U.S. Cl.
CPC ............... *C11D 3/30* (2013.01); *C11D 7/08* (2013.01); *C11D 7/265* (2013.01); *C11D 7/3245* (2013.01); *C25D 3/02* (2013.01)

(56) References Cited

U.S. PATENT DOCUMENTS

| | | |
|---|---|---|
| 7,343,978 B2 | 3/2008 | Jones et al. |
| 7,350,574 B2 | 4/2008 | Santra et al. |
| 7,561,998 B2 | 7/2009 | Panga et al. |
| 7,774,183 B2 | 8/2010 | Tardy et al. |
| 8,043,996 B2 | 10/2011 | Harris |
| 8,096,361 B2 | 1/2012 | Willberg |
| 2002/0104657 A1 | 8/2002 | Frenier et al. |
| 2002/0170715 A1 | 11/2002 | Frenier |
| 2004/0092103 A1 | 5/2004 | Fujii et al. |
| 2005/0056423 A1 | 3/2005 | Todd et al. |
| 2006/0142166 A1 | 6/2006 | Thomas |
| 2006/0261313 A1 | 11/2006 | Nakayama |
| 2006/0281636 A1 | 12/2006 | Smith et al. |
| 2006/0288910 A1 | 12/2006 | Santra et al. |
| 2007/0281868 A1 | 12/2007 | Pauls et al. |
| 2008/0035339 A1* | 2/2008 | Welton et al. ............... 166/279 |
| 2009/0023613 A1 | 1/2009 | Li et al. |
| 2009/0192057 A1 | 7/2009 | Frenier et al. |
| 2010/0331223 A1 | 12/2010 | Li et al. |
| 2011/0284222 A1 | 11/2011 | Chaabouni et al. |
| 2012/0000652 A1 | 1/2012 | Jones et al. |
| 2012/0031613 A1 | 2/2012 | Green |
| 2012/0067576 A1 | 3/2012 | Reyes et al. |
| 2012/0094878 A1 | 4/2012 | Al-Mutairi et al. |
| 2012/0097392 A1 | 4/2012 | Reyes et al. |
| 2012/0115759 A1 | 5/2012 | Reyes |
| 2012/0145401 A1 | 6/2012 | Reyes |
| 2012/0186811 A1 | 7/2012 | Welton et al. |

FOREIGN PATENT DOCUMENTS

| | | |
|---|---|---|
| EP | 1 552 107 B1 | 7/2005 |
| EP | 1 618 282 B1 | 1/2006 |
| EP | 1 817 391 B1 | 8/2007 |
| JP | 2004-315412 | 11/2004 |
| JP | 2006-117980 | 5/2006 |
| JP | 2006-183079 | 7/2006 |
| JP | 2009-125680 A | 6/2009 |
| WO | WO 96/22351 A1 | 7/1996 |
| WO | 01/83639 | 11/2001 |
| WO | 02/092964 | 11/2002 |
| WO | 03/036021 | 5/2003 |
| WO | WO 2004/013055 A1 | 2/2004 |
| WO | 2005/028592 | 3/2005 |
| WO | WO 2005/028592 A1 | 3/2005 |
| WO | WO 2006/064440 A1 | 6/2006 |
| WO | WO 2007/046072 A2 | 4/2007 |
| WO | WO 2007/066269 A2 | 6/2007 |
| WO | WO 2007/085983 A1 | 8/2007 |
| WO | 2007/104054 | 9/2007 |
| WO | WO 2007/104054 A1 | 9/2007 |
| WO | WO 2007/116366 A2 | 10/2007 |
| WO | WO 2008/015464 A1 | 2/2008 |
| WO | 2008/065109 | 6/2008 |
| WO | WO 2008/073233 A2 | 6/2008 |
| WO | WO 2008/103551 A2 | 8/2008 |
| WO | WO 2008/139164 A1 | 11/2008 |
| WO | WO 2009/006326 A2 | 1/2009 |
| WO | WO 2009/022106 A1 | 2/2009 |
| WO | WO 2009/091652 A2 | 7/2009 |
| WO | WO 2009/137399 A2 | 11/2009 |
| WO | WO 2010/107721 A2 | 9/2010 |
| WO | WO 2011/012861 A1 | 2/2011 |
| WO | WO 2011/031920 A2 | 3/2011 |
| WO | WO 2012/001396 A1 | 1/2012 |
| WO | WO 2012/003356 A2 | 1/2012 |
| WO | WO 2012/044986 A2 | 4/2012 |
| WO | WO 2012/104582 A1 | 8/2012 |
| WO | WO 2012/116032 A1 | 8/2012 |
| WO | WO 2012/127183 A1 | 9/2012 |
| WO | WO 2012/127191 A1 | 9/2012 |
| WO | WO 2012/142396 A1 | 10/2012 |
| WO | WO 2012/146895 A1 | 11/2012 |
| WO | WO 2012/150435 A1 | 11/2012 |

OTHER PUBLICATIONS

Frenier, Wayne W., et al., "Use of Highly Acid-Soluble Chelating Agents in Well Stimulation Services", *Society of Petroleum Engineers*, pp. 1-12, (2000).
Frenier, Wayne W., "Development and Testing of a Low-Hazard Corrosion Inhibitor for Use in Organic Acid and Chelant-Based Cleaning Solutions", *HydroChem Industrial Services*, pp. 440-447, (1998).
International Search Report and Written Opinion, International PCT Application No. PCT/EP2008/063618, dated Feb. 10, 2009.
European Search Report, European Application No. 08151179.2, dated Jul. 22, 2008.
International Preliminary Report on Patentability, International PCT Application No. PCT/EP2008/063618, dated Mar. 2, 2010.
JP 2009-125680 English language machine translation dated Jan. 29, 2013.
Al-Harthy et al., "Options for High-Temperature Well Stimulation," Oilfield Review, 2009 Schlumberger, pp. 52-62.
Shaughnessy et al., SPE 11188, "EDTA Removes formation damage at Prudhoe bay," 1982 Society of Petroleum Engineers Inc., 12 pages.
Fredd et al., SPE 31074, "Alternative Stimulation Fluids and Their Impact on Carbonate Acidizing," 1998 Society of Petroleum Engineers Inc., pp. 34-41.
Taylor et al., SPE 39419, "A Systematic Study of Iron Control Chemicals Used During Well Stimulation," 1998 SPE Int'l Symposium on Formation Damage, pp. 1-6.
Taylor et al., SPE 50772, "A Systematic Study of Iron Control Chemicals—Part 2," 1999 SPE Int'l Symposium on Oilfield Chemistry, pp. 1-8.
Frenier et al., SPE 63242, Use of Highly Acid-Soluble Chelating Agents in Well Stimulation Services, 2000 SPE Annual Technical Conference & Exhibition, pp. 1-12.
Frenier et al., SPE 71696, "Hydroxyaminocarboxylic Acids Produce Superior Formulations for Matrix Stimulation of Carbonates at High Temperatures," 2001, pp. 1-16.
Frenier et al., SPE 80597, "A Biodegradable Chelating Agent is Developed for Stimulation of Oil and Gas Formations," 2003, pp. 1-13.
Al-Khaldi et al., SPE 82218, "New Findings on Damage Potential, Geochemical Reaction Mechanisms, and Production . . . ," 2005, pp. 267-275.
Frenier et al., SPE 86522, "Hot Oil and Gas Wells Can Be Stimulated Without Acids," 2004, pp. 189-199.
Collins et al., SPE 140816, "A Biodegradable Chelating Agent Designed to be an Environmentally Friendly Filter-cake Breaker," 2011, pp. 1-10.

* cited by examiner

Figure 1 Maximum solubility of chelating agents in aqueous acetic acid, formic acid and hydrochloric acid Maximum solubility of chelating agents in aqueous sulfuric acid, phosphoric acid and nitric acid

US 9,803,134 B2

ACIDIC AQUEOUS SOLUTION CONTAINING A CHELATING AGENT AND THE USE THEREOF

REFERENCE TO RELATED APPLICATION(S)

This application is the U.S. National Phase of PCT/EP2008/063618 filed on Oct. 10, 2008 and claims the benefit of U.S. Provisional Application No. 61/019,913 filed on Jan. 9, 2008.

BACKGROUND OF THE INVENTION

Field of the Invention

The present invention relates to acidic aqueous solutions containing a chelating agent and an acid and the use thereof.

Description of Related Art

Acidic aqueous solutions containing a chelating agent and their use in oil well stimulation are known from, e.g., SPE 63242, W. W. Frenier et al., "Use of Highly Acid-Soluble Chelating Agents in Well Stimulation Services", 2000 SPE Annual Technical Conference, Dallas Tex., Oct. 1-4, 2000, which discloses stimulation acids that can be used in oil field chemical treatments to prevent precipitation of solids as the acid spends on the formation being treated and to prevent and remove scale. The acidic aqueous solutions disclosed contain, e.g., ethylenediamine tetraacetic acid (EDTA), hydroxyethyl ethylenediamine triacetic acid (HEDTA) or nitrilotriacetic acid (NTA) combined with hydrochloric acid. It is said that EDTA has a relatively low solubility in hydrochloric acid, but that NTA and HEDTA are more readily soluble and control precipitation of iron better.

U.S. 2007/281868 discloses acidic treatment fluids for treating subterranean formations. The fluids can comprise optional chelating agents such as EDTA or GLDA. However, this document neither provides any disclosure as to the amount of chelating agent to be added to the fluids, nor acknowledges the different solubilities of the several chelating agents in acidic fluids.

However, there is a need in the art for acidic aqueous solutions containing a chelating agent and an (other) acid that have a higher chelating agent content and a more acidic pH wherein the chelating agent remains in the dissolved state during storage and transport.

SUMMARY OF THE INVENTION

It was surprisingly found that glutamic acid N,N-diacetic acid (GLDA) and the salts thereof have a higher solubility in aqueous acids over the whole of the concentration range these aqueous acids are available in than other chelating agents like NTA and HEDTA and that they remain dissolved in aqueous solutions having a more acidic pH besides.

DETAILED DESCRIPTION OF THE INVENTION

Figure 1:
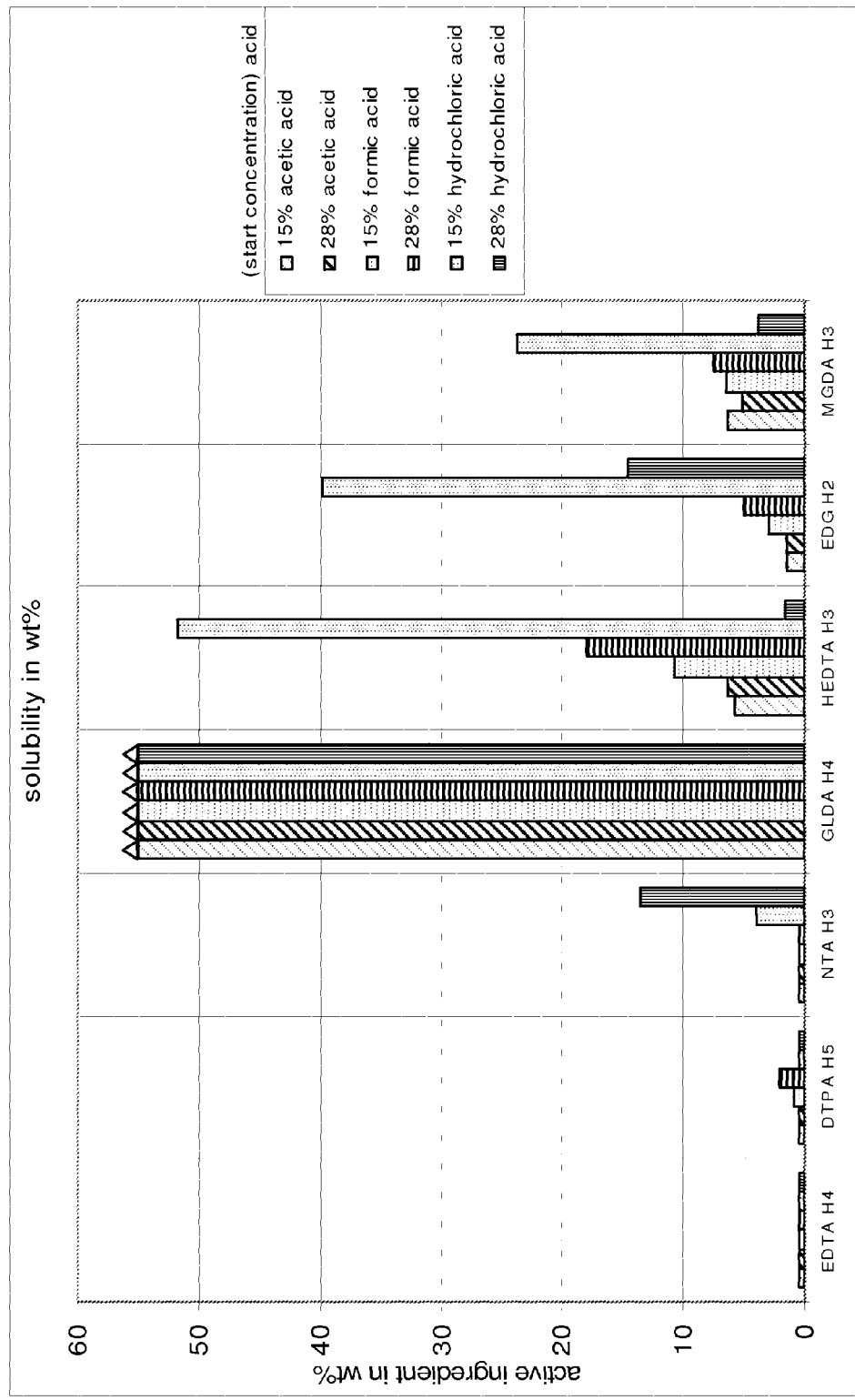
FIG. 1 shows the solubility of various chelating agents in aqueous acetic acid, formic acid and hydrochloric acid.

The present invention provides acidic aqueous solutions containing a chelating agent and an acid wherein the chelating agent is glutamic acid N,N-diacetic acid or a salt thereof and wherein the amount of GLDA or the salt thereof is at least 10 wt %, based on the weight of the aqueous solution.

It has been found that compared to the other chelating agents, glutamic acid N,N-diacetic acid (GLDA), a biodegradable chelating agent, is highly soluble in a broad range of aqueous acids, such as aqueous hydrochloric acid, aqueous formic acid, and aqueous acetic acid.

The new solutions may be applicable in, e.g., acidizing, a process currently used to ensure increased production of an oil source by acid digestion of the smaller channels in oil formation for better oil flow. Currently, oil companies use solutions of NTA in aqueous HCl. The chelating agent has a dual function; it complexes iron released in the formation and it prevents the (re)precipitation of calcium that dissolves due to the use of the acid.

In its application as an oil field chemical, the acidic aqueous solution of the invention is capable of preventing iron precipitates and removing scale. Scale in general is a calcium, barium or strontium salt, like calcium carbonate or barium sulfate. The acidic aqueous solutions of the invention are particularly suitable for removing a calcium carbonate scale. Additionally, the acidic aqueous solution functions as a dissolution agent of carbonate formations in the well.

Accordingly, the present invention also relates to the use of the above solutions containing GLDA and another acid as an oil field chemical.

In this application, oil field chemical means a chemical used in the oil field industry such as in completions and stimulation by acidizing, fracturing, and descaling.

Additionally, the present invention also relates to the use of the above aqueous acidic solutions in processes, such as cleaning processes or plating processes, in which highly concentrated aqueous acids are used, for instance industrial cleaning, electroplating, and electroless plating.

Also the invention relates to the use of the above aqueous acidic solutions in descaling processes in industries other than the oil field industry.

It should be noted that JP2006/183079 discloses in Example 4 an electrolytic bath for bismuth plating containing both N,N-dicarboxymethyl L-glutamic acid and ethane sulfonic acid, as well as a respectable amount of bismuth-containing components. The amount of N,N-dicarboxymethyl L-glutamic acid in this Example 4 is 3 wt % and for the several solutions in the other Examples of the document wherein the chelating agent is not GLDA, the amount of chelating agent in the acidic aqueous solution is always below 10 wt %.

It should additionally be noted that JP 2006/117980, also related to bismuth plating, discloses in Example 17 the preparation of an acidic aqueous solution containing 10.1 g/L of GLDA, which corresponds to an acidic aqueous solution comprising about 1 wt % of GLDA. Further, this document neither discloses any acidic aqueous solution at all containing more than 10 wt % of a chelating agent, nor offers any disclosure regarding the solubility of chelating agents in acidic aqueous solutions at all.

Finally, JP 2004/315412 discloses a hydrogen-peroxide composition that contains (A) hydrogen peroxide, (B) inter alia, glutamic acid diacetates, (C) water, and (D) a compound chosen from phosphoric, citric, and hydroxyethane diphosphonic acid. In the Examples, compound (B) is used in an amount of only 0.1 wt %.

It is understood that an acidic solution additionally containing bismuth or any other metal is not suitable for use in oil well stimulation or cleaning processes and that bismuth is the least preferred metal in a plating process. Additionally, a person skilled in the art would not use a composition comprising hydrogen peroxide as a chemical in oil field chemistry or plating.

In consequence, in one embodiment the acidic aqueous solutions of the present invention do not contain a respectable amount of bismuth; preferably, they are substantially free of such metal. Also in a preferred embodiment, depending on the intended use of the solutions, they are substantially free of hydrogen peroxide.

If the solutions of the present invention are used for a plating process, in a preferred embodiment they contain aluminum-, nickel- or copper-containing components.

It has been found that the acidic aqueous solutions of the present invention have a better iron binding capacity than the state of the art acidic aqueous solutions containing a chelating agent. Also, the aqueous solutions of the present invention can have a more acidic pH, as GLDA will remain soluble even at a very acidic pH and in high concentrations. The combined low pH and high chelating agent content will give a combined higher iron binding capacity and digestion of oil formation and an improved scale prevention and removal besides.

In a preferred embodiment, the acidic aqueous solutions of the present invention have a pH of below 7, preferably a pH of below 3, and most preferably a pH of below 1. In one embodiment, the pH is above −5, preferably above −3, even more preferably above −1, most preferably above 0.

The acid in the acidic aqueous solutions of the present invention may be an acid that can be dissolved in an aqueous solution in a relatively high concentration as well known by a person skilled in the art. In one embodiment, the acid is selected from hydrochloric acid, hydrobromic acid, hydrofluoric acid, hydroiodic acid, sulfuric acid, nitric acid, phosphoric acid, formic acid, acetic acid, citric acid, lactic acid, malic acid, tartaric acid, maleic acid, boric acid, hydrogen sulfide, or a mixture of two or more of these acids. Also precursors of the acids can be used in the invention, an example thereof is ammonium bifluoride, a hydrofluoric acid precursor. Preferably, the acid is not a too expensive acid, such as ethane sulfonic acid. In a still more preferred embodiment, the acid is selected from the group of hydrochloric acid, hydrobromic acid, hydrofluoric acid, sulfuric acid, nitric acid, phosphoric acid, formic acid, acetic acid, or a mixture of two or more of these acids.

The acid is preferably present in the acidic aqueous solution in an amount of at least 5 wt %, preferably at least 10 wt %, even more preferably at least 15 wt %, most preferably at least 20 wt %. It is understood that each acid has a different maximum solubility in water; for example, hydrofluoric acid is commercially available in a concentration of 48 wt % in water. Preferably, however, the acid concentration is below 40 wt %, as such aqueous solutions are commercially available at a reasonable price and have proven to be sufficiently effective.

The GLDA is present in the acidic aqueous solution in an amount of at least 10 wt % and up to 60 wt %, based on the weight of the aqueous solution, preferably between 20 and 60 wt %, even more preferably between 30 and 60 wt %, most preferably between 40 and 60 wt %.

The aqueous solution of the invention may additionally contain other additives known to be suitable in the separate applications claimed, such as, e.g., surfactants, builders, wetting agents, emulsifiers, bleaching agents.

EXAMPLE

Acidic aqueous solutions were made on the basis of 15% acetic acid, 28% acetic acid (both prepared from acetic acid ex Fluka), 15% formic acid, 28% formic acid (both prepared from formic acid ex Fluka), 15% hydrochloric acid and 28% hydrochloric acid (both prepared from 37% HCl ex Fluka), 15% sulfuric acid and 28% sulfuric acid (both prepared from 96% $H_2SO_4$ Fluka) 15% phosphoric acid and 28% phosphoric acid (both prepared from 85% $H_3PO_4$ Fluka), 15% nitric acid and 28% nitric acid (both prepared from 65% $HNO_3$ Fluka).

To the above aqueous acidic solutions several chelating agents were added until the maximum solubility was reached. This was done by adding the chelating agent to the acidic aqueous solution until a saturated solution was achieved (which is established visually) and, subsequently, stirring for 3 days, after which any solid material present was allowed to settle. Solid material present in the solution could be due to material never having dissolved or to material solidifying during the 3-day stirring of the solution.

The amount of chelating agent of the clear liquid layer was determined by titrating with a metal cation (Cu for EDG and Fe for all other chelating agents), but not in the case of solutions where it was directly clear that the chelating agent was soluble in an amount of less than about 0.5 wt %.

The chelating agents used were the following acids:
ethylenediamine tetraacetic acid (EDTA), Dissolvine Z ex Akzo Nobel;
diethylenetriamine pentaacetic acid (DTPA), Dissolvine DZ ex Akzo Nobel;
nitrilotriacetic acid (NTA), Dissolvine AZ ex Akzo Nobel;
hydroxyethyl ethylenediamine triacetic acid (HEDTA) ex Aldrich;
ethanoldiglycine (EDG), Dissolvine EDG ex Akzo Nobel treated with hydrochloric acid and isolated after crystallization;
methylglycine diacetic acid (MGDA) Trilon M ex BASF treated with a hydrochloric acid and isolated after crystallization; and
glutamic acid diacetic acid (GLDA) Dissolvine GL-38 ex Akzo Nobel treated with an ion exchange acidic resin and dried.

Figure 2:
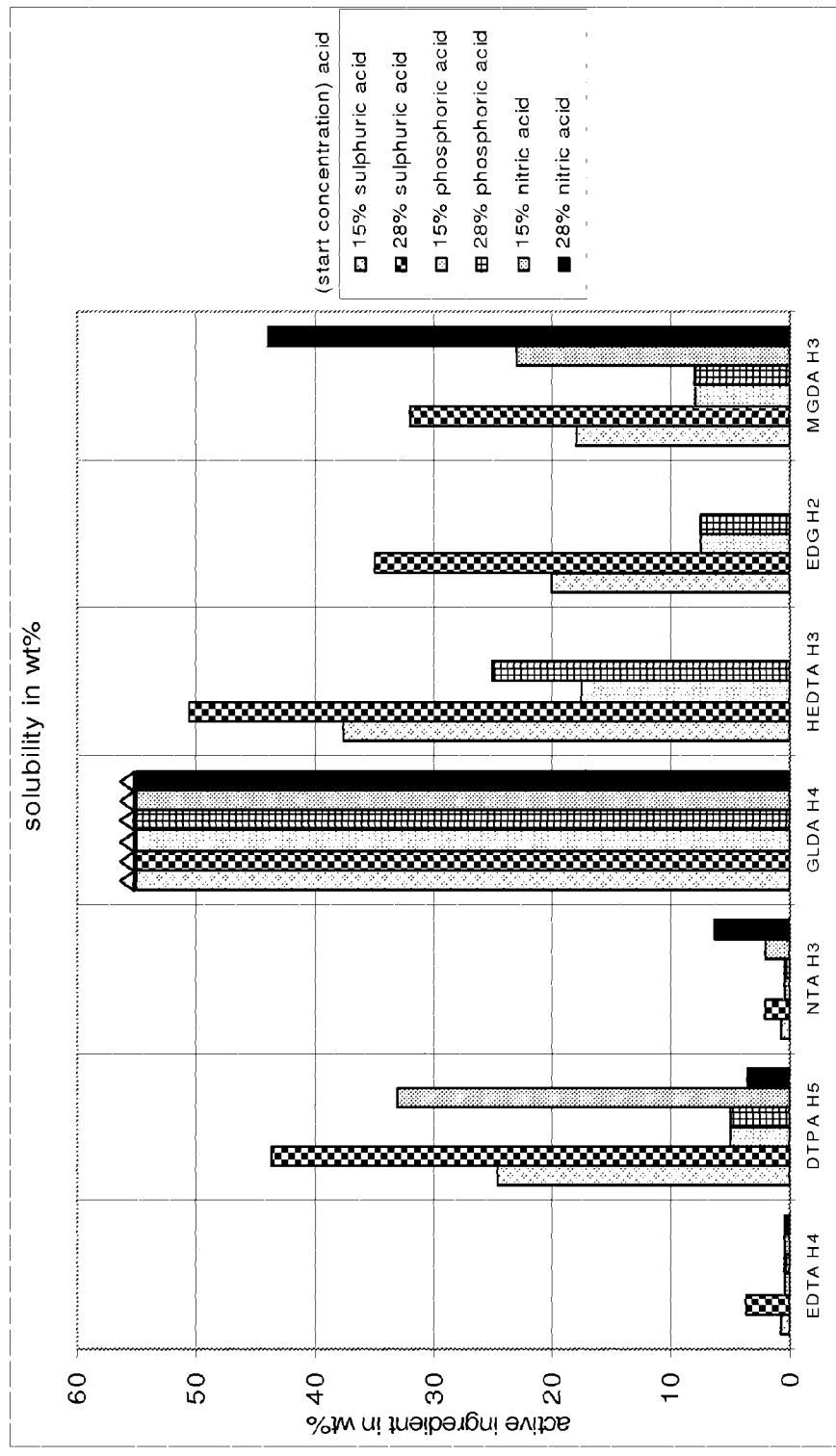
FIG. 2 shows the solubility of various chelating agents in aqueous sulfuric acid, phosphoric acid and nitric acid.

The maximum solubility is represented in FIGS. 1 and 2 below. It can be seen that the chelating agent GLDA is much better soluble over the whole group of concentrated aqueous acidic solutions than any of the other tested chelating agents, though a few chelating agents are relatively well soluble in 15% hydrochloric acid and in sulfuric acid.

The maximum solubility of the chelating agents was determined in the major part of the experiment by using the Fe-TSV method (a method well known in this industry in which Fe(III) ions are added to a known amount of chelate solution and in which the end point of the titration is noticed by the fact that an excess of Fe ions won't be sequestered by the chelate). The solubility of EDG was determined by using the Cu-TSV method (in this method Cu ions are added instead of Fe ions). The determination of the amount of EDG in the clear liquid layer of the aqueous acetic acid solution could not be done by titration with copper, as the buffering capability of acetic acid would hinder such titration. To be able to determine the amount of EDG in the aqueous acetic acid solution, small amounts of EDG were added to the said solution. After the addition of 1% of EDG the solution stayed clear and the addition of 2% of EDG resulted in a turbid mixture in which clearly some EDG was present in the solidified form. Therefore, it was concluded that the solubility of EDG in acetic acid is about 1.5 wt %. The same procedure was followed when determining the solubility of chelating agents in phosphoric acid as these solutions are also hard to titrate; again, there was a stepwise (1 wt % per step) addition of chelating agent to the acid until the chelating agent did not dissolve anymore.

The solubility of MGDA was only tested in a limited number of aqueous acids. MGDA appeared to be reasonably soluble in aqueous 15% HCl solutions in the first instance, but a quite high amount of the chelating agent solidified in the acidic solution 3 days after being added thereto. The same happened with the aqueous solution of DTPA and 15% nitric acid, here as well a significant amount of chelating agent solidified after 3 days.

GLDA actually is even more soluble than was found in the experiments, but the increasing viscosity meant that adding more GLDA to the solution would make further stirring too complicated.

The solubility of HEDTA and EDG in nitric acid cannot be determined as the combination of these chelating agents with nitric acid will lead to a hazardous decomposition, because nitric acid is a potential oxidizing medium.

The invention claimed is:

1. A process of using an acidic aqueous solution in an oil field in completion or stimulation, the process comprising at least one of acidizing, fracturing or descaling with the acidic aqueous solution,
    wherein the acidic aqueous solution contains a chelating agent and an acid,
    wherein the chelating agent is glutamic acid N,N-diacetic acid (GLDA) or a salt thereof and is dissolved in the acidic aqueous solution,
    wherein the amount of GLDA or the salt thereof is at least 10 and up to 60 wt %, based on the weight of the aqueous solution, and
    wherein the acid is selected from the group consisting of hydrochloric acid, hydrobromic acid, hydrofluoric acid, hydroiodic acid, sulfuric acid, nitric acid, phosphoric acid, formic acid, acetic acid, citric acid, lactic acid, malic acid, tartaric acid, maleic acid, boric acid, hydrogen sulfide, and a mixture of two or more of these acids.

2. The process of claim 1, wherein the acidic aqueous solution has a pH of below 3.

3. The process of claim 1, wherein the process comprises acidizing with the acidic aqueous solution.

4. The process of claim 3, wherein the acidic aqueous solution has a pH of below 3.

5. The process of claim 1, wherein the process comprises fracturing with the acidic aqueous solution.

6. The process of claim 5, wherein the acidic aqueous solution has a pH of below 3.

7. The process of claim 1, wherein the process comprises descaling with the acidic aqueous solution.

8. The process of claim 7, wherein the acidic aqueous solution has a pH of below 3.

9. The process of claim 1, wherein the amount of the acid is at least 5 wt %.

10. The process of claim 1, wherein the acidic aqueous solution has a pH of below 1.

11. A process comprising cleaning, plating or descaling with an acidic aqueous solution containing a chelating agent and an acid,
    wherein the chelating agent is glutamic acid N,N-diacetic acid (GLDA) or a salt thereof and is dissolved in the acidic aqueous solution,
    wherein the amount of GLDA or the salt thereof is at least 10 and up to 60 wt %, based on the weight of the aqueous solution, and
    wherein the acid is selected from the group consisting of hydrochloric acid, hydrobromic acid, hydrofluoric acid, hydroiodic acid, sulfuric acid, nitric acid, phosphoric acid, formic acid, acetic acid, citric acid, lactic acid, malic acid, tartaric acid, maleic acid, boric acid, hydrogen sulfide, and a mixture of two or more of these acids.

12. The process of claim 11, wherein the process comprises cleaning with the acidic aqueous solution.

13. The process of claim 12, wherein the acidic aqueous solution has a pH of below 3.

14. The process of claim 11, wherein the process comprises plating with the acidic aqueous solution.

15. The process of claim 14, wherein the acidic aqueous solution has a pH of below 3.

16. The process of claim 11, wherein the process comprises descaling with the acidic aqueous solution.

17. The process of claim 16, wherein the acidic aqueous solution has a pH of below 3.

18. The process of claim 11, wherein the acidic aqueous solution has a pH of below 3.

19. The process of claim 11, wherein the acidic aqueous solution is substantially free of bismuth.

20. The process of claim 11, wherein the acidic aqueous solution is substantially free of hydrogen peroxide.

21. The process of claim 11, wherein the amount of the acid is at least 5 wt %.

22. An acidic aqueous solution containing a chelating agent, an acid, and an additive,
    wherein the chelating agent is glutamic acid N,N-diacetic acid (GLDA) or a salt thereof and is dissolved in the acidic aqueous solution,
    wherein the amount of GLDA or the salt thereof is at least 10 and up to 60 wt %, based on the weight of the aqueous solution, and
    wherein the acid is selected from the group consisting of hydrochloric acid, hydrobromic acid, hydrofluoric acid, hydroiodic acid, sulfuric acid, nitric acid, phosphoric acid, formic acid, acetic acid, citric acid, lactic acid, malic acid, tartaric acid, maleic acid, boric acid, hydrogen sulfide, and a mixture of two or more of these acids and wherein the additive is selected from the group consisting of surfactants, builders, wetting agents, emulsifiers, and bleaching agents.

23. The acidic aqueous solution of claim 22 having a pH of below 3.

24. The acidic aqueous solution of claim 22, wherein the acidic aqueous solution is substantially free of bismuth.

25. The acidic aqueous solution of claim 22, wherein the acidic aqueous solution is substantially free of hydrogen peroxide.

26. The process of claim 22, wherein the amount of the acid is at least 5 wt %.

* * * * *